US010613320B2

(12) United States Patent
Masson et al.

(10) Patent No.: US 10,613,320 B2
(45) Date of Patent: Apr. 7, 2020

(54) PROJECTION DEVICE

(71) Applicant: North Inc., Kitchener (CA)

(72) Inventors: Jonathan Masson, Pully (CH); Lucio Kilcher, Montreux (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 16/230,986

(22) Filed: Dec. 21, 2018

(65) Prior Publication Data
US 2019/0129196 A1 May 2, 2019

Related U.S. Application Data

(63) Continuation of application No. 14/890,379, filed as application No. PCT/EP2013/059723 on May 10, 2013.

(51) Int. Cl.
G02B 26/10 (2006.01)
G02B 5/02 (2006.01)
(Continued)

(52) U.S. Cl.
CPC ......... G02B 26/105 (2013.01); G02B 5/0215 (2013.01); G02B 26/0833 (2013.01); G02B 2027/013 (2013.01)

(58) Field of Classification Search
None
See application file for complete search history.

(56) References Cited

U.S. PATENT DOCUMENTS

2003/0142247 A1 7/2003 Nishiyama et al.
2003/0214718 A1 11/2003 Kaminsky et al.
(Continued)

FOREIGN PATENT DOCUMENTS

JP 2010254149 11/2010
JP 2012163613 8/2012

OTHER PUBLICATIONS

International Search Report, dated Oct. 12, 2003, Application No. PCT/EP2013/059723, filed May 10, 2013, pp. 3.

(Continued)

Primary Examiner — Darryl J Collins
Assistant Examiner — Journey F Sumlar
(74) Attorney, Agent, or Firm — Thomas Mahon

(57) ABSTRACT

A projection device According to the present invention there is provided a projection device (30,50,100) comprising, a light source (31,61) which can provide light beams (32a,b,c 62a,b,c), wherein the light beams (32a,b,c 62a,b,c) can be used to define one or more pixels of a virtual image (48); a MEMS micro mirror (34) which is arranged to receive the light beams (32a,b,c 62a,b,c) provided by the light source (31,61), and wherein the MEMS micro mirror (34) can oscillate about at least one oscillation axis (7,17) to scan the light beams (32a,b,c 62a,b,c); a reflective element (38), which comprises a plurality of convex reflective projections (39), and wherein the reflective element (38) is arranged so that light beams (32a,b,c 62a,b,c) reflected by the MEMS micro mirror (34) are incident on said convex reflective projections (39), so that the light beams (32a,b,c 62a,b,c) are reflected by the convex reflective projections (39); a beam combiner (45,81), wherein the beam combiner is arranged to receive the light beams (32a,b,c 62a,b,c) which are reflected by the convex reflective projections (39) wherein the beam combiner (45,81) is configured to at least partially reflect the light beams (32a,b,c 62a,b,c) which it receives so that the light beams (32a,b,c 62a,b,c) can form a virtual image (48) which is visible when viewed from within an eyebox (47). There is further provided a corresponding method of projecting a virtual image.

12 Claims, 9 Drawing Sheets

(51) Int. Cl.
*G02B 26/08* (2006.01)
*G02B 27/01* (2006.01)

(56) References Cited

U.S. PATENT DOCUMENTS

2009/0034087 A1   2/2009   Hung et al.
2013/0050593 A1   2/2013   Fujikawa
2013/0094092 A1   4/2013   Imahori et al.

OTHER PUBLICATIONS

Office Action received for Korean Patent Application No. 2015-7032244, dated Dec. 13, 2016, 9 pages.
Office Action received for Korean Patent Application No. 2015-7032244, dated Sep. 6, 2017, 4 pages English translation.
Chen, et al. Compensating technique of field-distorting error for the CO2 laser galvanometric scanning drilling machines, International Journal of Machine Tools and Manufacture, vol. 47, No. 7-8, Jun. 2007, 11 pages.

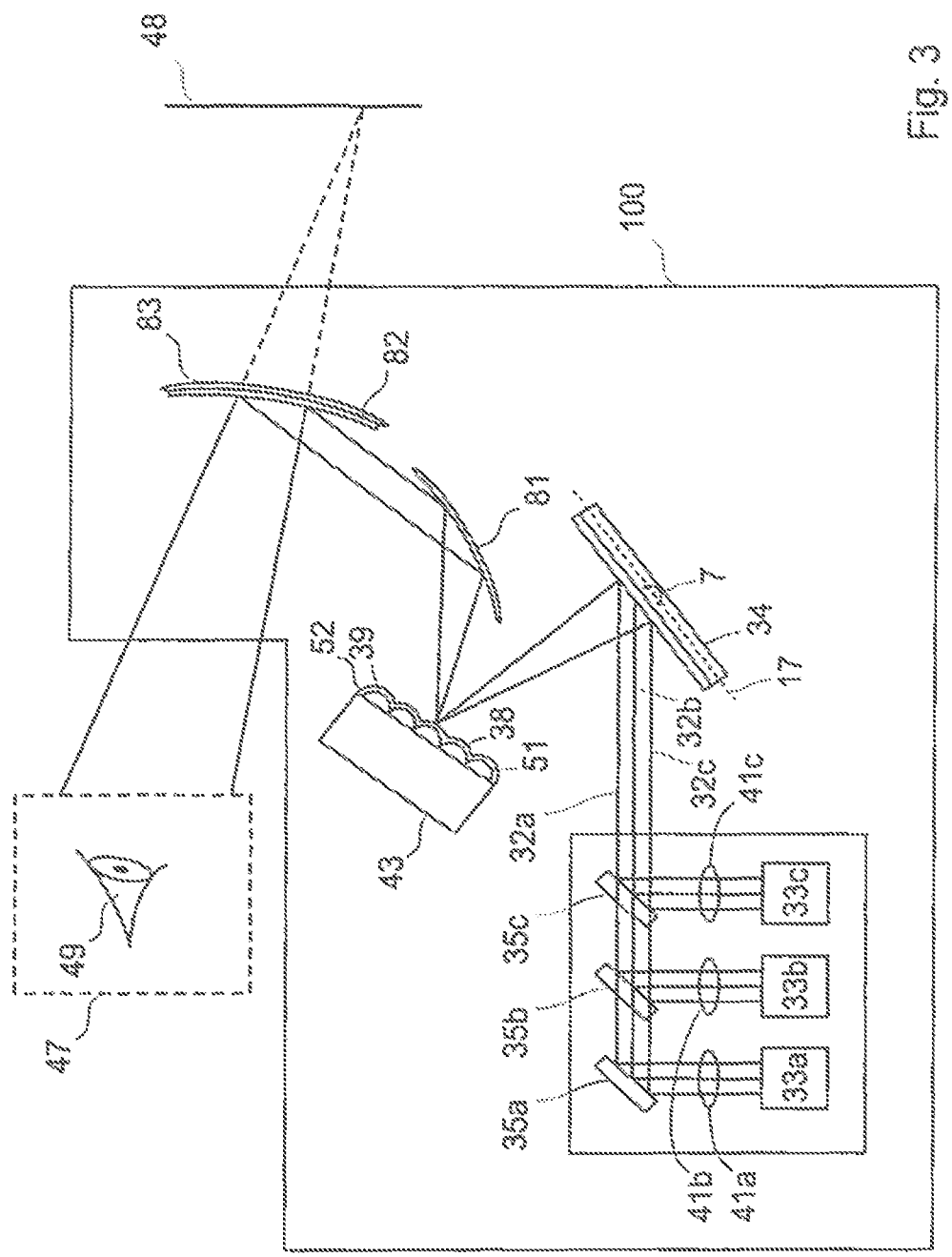

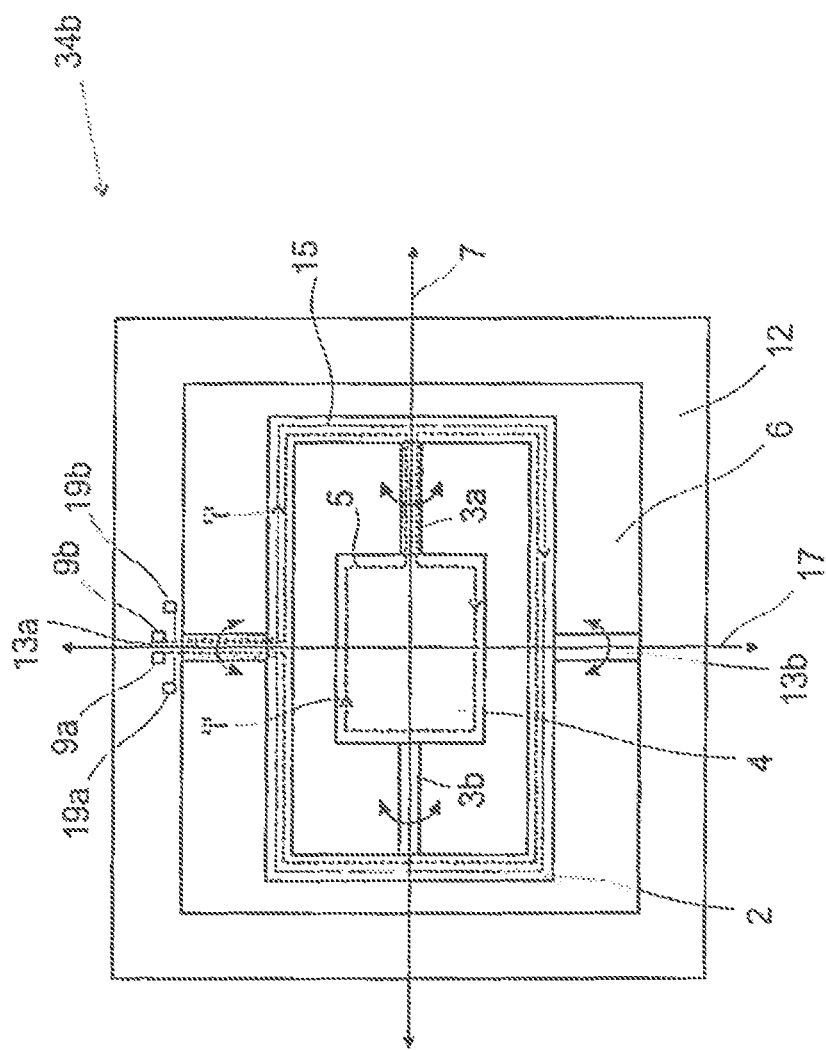

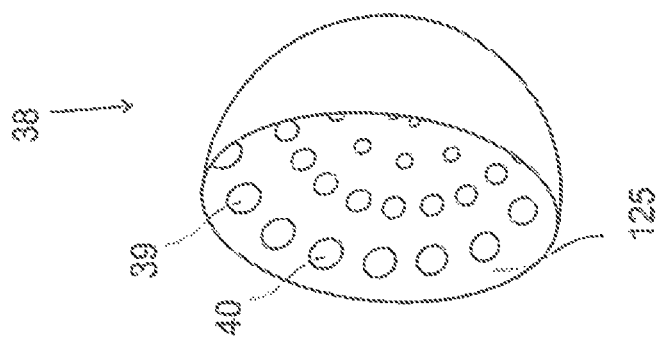
Fig. 5c
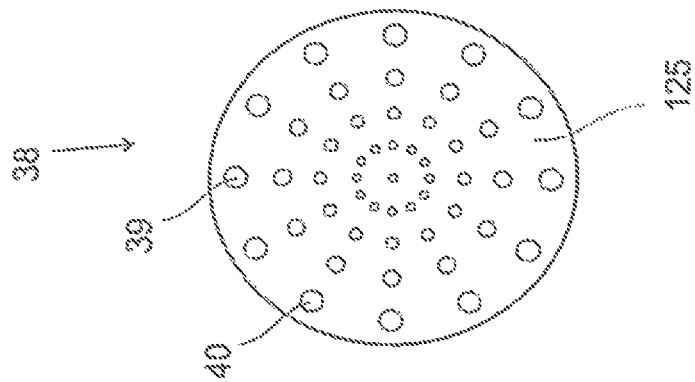
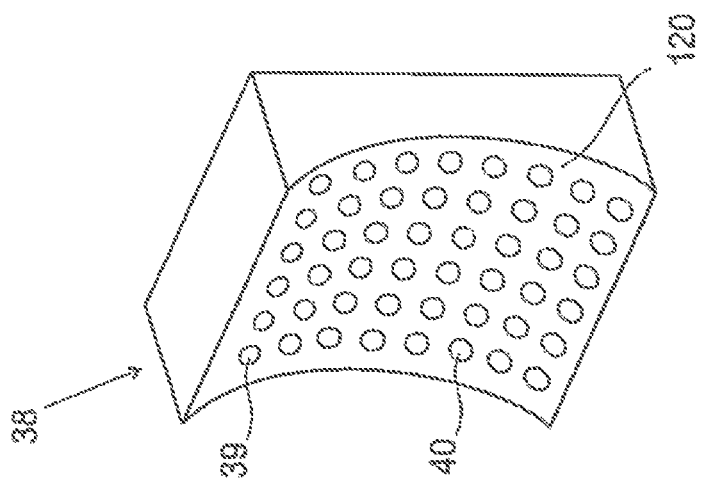
Fig. 5b

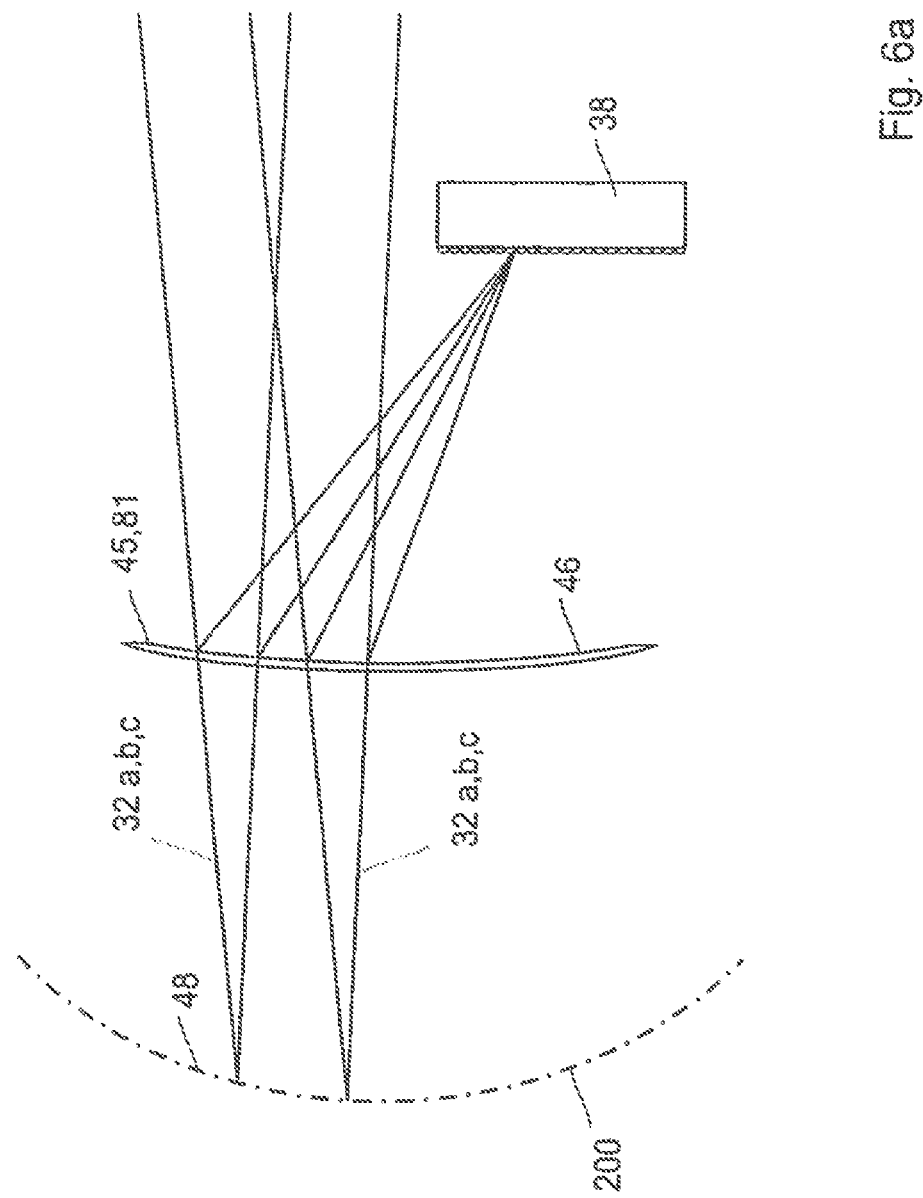

PROJECTION DEVICE

CROSS-REFERENCE TO RELATED APPLICATIONS

This application is a continuation of U.S. patent application Ser. No. 14/890,379, filed Nov. 10, 2015 (which is a national stage application under 35 U.S.C. 371 of international application No. PCT/EP2013/059723, filed on May 10, 2013), the entire content of which is hereby incorporated by reference.

FIELD OF THE INVENTION

The present invention relates to a projection device and in particularly, but not exclusively, to a projection device which comprises a diffuser in the form of a reflective element which comprises a plurality of reflective convex projections which reflect light beams to a beam combiner to project a virtual image. There is further provided a corresponding method of projecting a virtual image.

DESCRIPTION OF RELATED ART

Most projection devices use a diffuser to reduce the occurrence of the speckle in the projected image.

In most cases a micro-lens array is used as a diffuser. Typically the micro-lenses in a micro-lens array are convex lenses and are sized between 10 to 500 µm. The micro-lens arrays are transparent during operation; thus the light beams must be transmitted through the micro-lenses in the micro-lens array in order to be diffused. Disadvantageously when the light beams are transmitted through the micro-lenses in the micro-lens array the light beams are diffracted and large amounts of light loss will occur in the micro-lens array. Furthermore, a large amount of parasitic light is created when the light beams are transmitted through the micro-lenses in the micro-lens array; this parasitic light creates speckle and/or visual parasitic patterns in the projected image as well as reducing the overall contrast between adjacent pixels.

In most micro-lens arrays the micro-lenses are held in their array formation by means of a transparent holder portion. Typically the transparent holder portion is composed of glass. The light beams must first transmit through the transparent holder portion before reaching the micro-lenses. The transparent holder portion thus further increases the amount of diffraction and light loss and also increases the amount of parasitic light which is created. The transparent holder portion, as well as the transparent lenses, can further generate chromatic aberration.

Accordingly a projection device which uses any of the above-mentioned micro-lens arrays will be unable to project a high quality image due to the large amounts of diffraction, light loss, parasitic light, and chromatic aberration.

Other micro-lens arrays comprise an array of reflective micro-lenses each of which have a concave profile. Moulds to manufacture such micro-lens arrays in high volume are very difficult to manufacture as the junctions between successive lens need to be pointed; if the junctions between successive lens are not pointed enough the junction will produce a lot of parasitic reflection during use which will decrease the quality of the projected image. Thus it is difficult, and expensive, to produce high volume projection systems, which use micro-lens arrays which comprise an array of micro-lenses each of which have a reflective concave profile, and which can project a good quality image.

Furthermore a micro-lens array, which comprises an array of reflective micro-lenses each of which have a concave profile, will focus the light beams it receives; the focused light beams pose a risk to users as the focused light beams may possess enough light energy to damage a user's eyes or accidentally ignite dust particles (for example, dust particles found on car windshields or dust particles on the dashboard of a car, if such projection devices are used in a car).

Additionally a projection device which uses any of the above-mentioned micro-lens arrays will not be compact, since in the case of micro-lens arrays which comprise convex lenses the microlens array must be placed between the projector and the combiner screen (e.g. in a head-up-display projection system), and in the case of micro-lens arrays which comprise reflective micro-lenses which have a concave profile, the light that is reflected on the reflective concave micro-lens array is first focused at the focal distance of those lenses before it starts to diffuse towards the combiner screen, therefore the distance between the diffuser and the combiner is larger to achieve the same image size in the combiner.

BRIEF SUMMARY OF THE INVENTION

According to the invention, there is provided a projection device comprising, a light source which can provide light beams, wherein the light beams can be used to define one or more pixels of a virtual image; a MEMS micro mirror which is arranged to receive the light beams provided by the light source, and wherein the MEMS micro mirror can oscillate about at least one oscillation axis to scan the light beams; a reflective element, which comprises a plurality of convex reflective projections, and wherein the reflective element is arranged so that light beams reflected by the MEMS micro mirror are incident on said convex reflective projections, so that the light beams are reflected by the convex reflective projections; a beam combiner, wherein the beam combiner is arranged to receive the light beams which are reflected by the convex reflective projections, wherein the beam combiner is configured to at reflect at least some of the light beams which it receives so that the light beams can form a virtual image which is visible when viewed from within an eyebox.

Since the beam combiner is configured to at reflect at least some of the light beams which it receives, at least part of the light which the beam combiner receives will be reflected by the beam combiner; the part of the light which is reflected will be used to form a virtual image.

In one embodiment the beam combiner may be semi-reflective and semi-transparent. As the beam combiner is semi-reflective the beam combiner will at reflect at least some of the light beams which it receives; since the beam combiner and semi-transparent it will also allows a viewer to see through the beam combiner. The light beams which are reflected form a virtual image which is visible when viewed from within an eyebox.

The virtual image is formed behind the beam combiner. The virtual image is created by the light beams which are reflected by the combiner. The light beams reflected by the convex reflective projections are diverging and are reflected by the combiner. A virtual image is formed, at the position where extrapolations of the divergent light beams intersect. The extrapolations of the divergent light beams intersect at a position behind the beam combiner; accordingly the virtual image will appear behind the beam combiner and not on the surface of the beam combiner, hence the term virtual image. The virtual image is formed only by the light beams which are reflected by the beam combiner. The light beams which are not reflected by the beam combiner, are transmitted through the beam combiner and are lost; the light beams which are transmitted through the beam combiner are not used to project the virtual image.

After the light beams have been reflected by the convex reflective projections in the reflective element the light beams will be diffused. Each of the diffused light beams will form a light cone. At least part of the diffused light beams are reflected by the beam combiner. The eyebox is defined by the volume in which the light cones of all the light beams which are reflected by the convex reflective projections on the reflective element and subsequently reflected by the beam combiner, overlap.

The beam combiner can be thin film coated by dielectric or metal layers so that a part of light is transmitted through the coating and the other part is reflected. Fresnel's law equations determine the amount of light which is reflected and transmitted by the dielectric coating. For metallic coating the thickness of metal is preferably less than the evanescent penetration depth of the light beams to allow light to be partially transmitted and partially reflected.

The reflective element acts as a diffuser to diffuse the light beams and reduce the occurrence of speckle in the virtual image.

As the light beams are reflected by the convex reflective projections the light beams do not transmit through an optical component (such as a micro-lens array); accordingly there is no diffraction of the light beams and there is a reduction of the amount of light loss and parasitic light. Therefore the projected image will show an enhanced contrast.

Additionally, since the convex reflective projections are used to reflect the light beams this obviates the need for a holder portion. Consequently there is no chromatic aberration generated.

Also, the mould needed to manufacture the convex reflective projections in volume is easier to make than the mould needed to manufacture micro-lens arrays which comprise concave reflective micro-lenses, as there is no requirement to provide pointed interfaces between the reflective projections. Accordingly, it is easier to manufacture the projection device of the present invention.

Furthermore since the convex reflective projections in the reflective element are convex, the reflected light beams will be diffused rather than focused. The light beams are never focused by the reflective element. Accordingly, the danger posed to a user's eyes is reduced.

Finally, as the light beams are reflected by the convex reflective projections of the reflective element, the focal point of the reflective element is located behind the convex reflective projections. Accordingly the length of the projection device can be reduced by an amount equal to twice the focal length of the reflective element to provide a more compact projection device.

It should be understood that the reflective element used in the projection device of the present invention may be manufactured using any of; hot embossing, nano-imprinting; roll-to-roll, diamond turning, photolithography patterning followed by a step of reflow, injection moulding, or etching (dry and/or wet). The manufacturing process may also include depositing a reflective layer which defines the reflective element, on a micro lens array which comprises array of convex lenses, where appropriate.

It will be understood that the light source may provide one or more light beams which define one or more pixels of an image. For example, the light source may provide a red, green and blue light beam which may be combined to define coloured pixels of the virtual image.

The reflective element may comprise a metallic sheet which comprises an array of convex projections.

The reflective element may comprise a micro-lens array, which comprises an array of reflective micro-lenses each of which have a convex profile. The reflective element may comprise a micro-lens array which comprises an array of convex micro-lenses, and a reflective layer which is mounted on a surface of micro lens array to form convex reflective projections. The reflective layer is preferably mounted on a surface of the convex micro-lenses to form convex reflective projections. The reflective layer preferably is configured so that it does not transmit any light, in other words the reflective layer is fully reflective. The micro-lens array may comprise a holder portion which holds the plurality of convex micro-lenses. The holder portion may be transparent to light beams. The convex micro-lenses may also be transparent to light beams. However, a holder portion is not essential to the invention. In fact, because the projection system of the present invention uses convex reflective projections to reflect light, advantageously this obviates the need for a holder portion or a micro lens array. If the projection device is provided with a holder portion then preferably the plurality of convex lenses are integral with the holder portion.

The reflective element is preferably arranged such that the convex reflective projections are closest to the MEMS micro mirror, than any other part of the reflective element. The reflective element is preferably arranged so that the convex reflective projections are closest to the MEMS micro mirror, than any other part of the reflective element, along a path followed by the light beams reflected from the MEMS micro mirror to the reflective element. This will ensure that the convex reflective projections are first to receive the light reflected by the MEMS micro mirror. In particular, this will ensure that the light beams are not transmitted through any part of the reflective element. Rather, the light beams will be reflected by the convex reflective projections without having passed through any other part of the reflective element. For example, if the reflective element comprises a micro-lens array which comprises an array of convex micro-lenses, and a reflective layer which is mounted on a surface of micro lens array to form convex reflective projections; then the reflective element will preferably be arranged such that the reflective layer which is mounted on a surface of micro lens array is closest to the MEMS micro mirror and the micro lens array is further away from the MEMS micro mirror. The light beams will thus be reflected by the convex reflective projections without the light beams having been transmitted through the holder portion or the micro-lens array.

The reflective element may comprise at least one of; Al, Au, Chromium, Ag, Ti, a protective layer such as $SiO_2$, SiN, and/or dielectric multilayer.

The convex reflective projections of the reflective element preferably each have a convex spherical profile.

The convex reflective projections of the reflective element may vary in size across the reflective element. The convex reflective projections of the reflective element may vary in their radius of curvature across the reflective element. The convex reflective projections of the reflective element may be offset from being alignment to one another (for example periodic, random or pseudo-random). The benefits of using, random or pseudo-random alignment reduces moiré effect because each reflective element creates a diffraction pattern that averages-out. Convex reflective projections on the borders of the array may have larger radius enabling lower divergence, therefore reducing light loss because of the light that would transmit out of the beam combiner, whereas the convex reflective projections around the centre may have smaller radius of curvature so as that the reflected light has direction to cover the combiner entirely.

The beam combiner may form a head-up-display.

After the light beams have been reflected by the convex reflective projections in the reflective element the light beams will be diffused. Each of the diffused light beams will form a light cone. At least some of the diffused light beams are reflected by the beam combiner. The eyebox is defined by the volume in which the light cones of all the light beams which are reflected by the convex reflective projections on the reflective element and subsequently reflected by the beam combiner, overlap. The size of the eyebox depends on the range of angles over which the beam combiner can receive light from the reflective element. This range of angles may depend on the size of the combiner, on the distance between the diffuser and combiner and on the distance between the virtual image and combiner. For example, a large combiner can receive light from the reflective element over a large range of angles, accordingly the volume in which all light cones overlap will be large and the thus the eyebox will be large; while a smaller combiner can receive light from the reflective element over a smaller range of angles, accordingly the volume in which all light cones overlap will be small and the thus the eyebox will be small.

The virtual image is formed behind the beam combiner. The light beams reflected by the convex reflective projections are diverging and are indecent on the beam combiner. Some of the light beams are reflected by the beam combiner and remain divergent after the reflection and some of the beams are transmitted through the beam combiner. A virtual image is formed at the position where extrapolations of the divergent light beams which are reflected by the beam combiner intersect (the intersection will occur at a position which is behind the beam combiner).

As mentioned in one embodiment the beam combiner may be semi-reflective and semi-transparent. The light beams which are transmitted through the beam combiner are lost; only those light beams which are reflected by the beam combiner are used to form the virtual image.

In another embodiment the beam combiner may be fully reflective. In such a case the projection device will further comprise a semi-reflective semi-transparent surface which receives light beams which are reflected from the fully reflective beam combiner. The surface may be provided on a windshield. Since the surface is semi-reflective it will reflect at least some of the light beams which it receives; since is surface is also semi-transparent it will also allow a viewer to see through the surface. The light beams which are reflected form a virtual image which is visible when viewed from within an eyebox. The semi-reflective surface which is provided on a windshield may form a head-up-display.

After the light beams have been reflected by the convex reflective projections in the reflective element the light beams will be diffused. Each of the diffused light beams will form a light cone. At least some the diffused light beams are reflected by the beam combiner. The eyebox is defined by the volume in which the light cones of all the light beams which are reflected by the convex reflective projections on the reflective element and subsequently reflected by the beam combiner, overlap. The size of the eyebox depends on the range of angles over which the semi-reflective semi-transparent surface which is provided on a windshield can receive light from the fully reflective beam combiner. This range of angles may depend on the size of the semi-reflective semi-transparent surface, on the distance between the beam combiner and semi-reflective semi-transparent surface and on the distance between the virtual image and semi-reflective semi-transparent surface. For example, a large semi-reflective semi-transparent surface can receive light from the fully reflective beam combiner over a large range of angles, accordingly the volume in which all light cones overlap will be large and the thus the eyebox will be large; while a smaller semi-reflective semi-transparent surface can receive light from the fully reflective beam combiner over a smaller range of angles, accordingly the volume in which all light cones overlap will be small and the thus the eyebox will be small.

The semi-reflective semi-transparent surface which is provided on windshield is used to reflect some of the light beams which it receives from the fully reflective beam combiner; only those light beams which are reflected from the semi-reflective semi-transparent surface are used to form the virtual image. Light beams which are transmitted through the semi-reflective semi-transparent surface are not used to form the virtual image. The shape of the windshield can affect the shape of the virtual image by shifting the angle at which light beams are reflected and also shifting the position of the light beams; this can cause distortion of the virtual image. The fully reflective beam combiner may also be configured to reduce distortion in the virtual image; for example the fully reflective beam combiner may have a spherical or aspherical concave surface so that geometrical deformation due to the windshield shape are compensated for.

Some of the light beams received at the semi-reflective semi-transparent surface are reflected and some of the light beams received at the semi-reflective semi-transparent surface are transmitted. The light beams which are reflected remain divergent after they have been reflected and another part of the light beams are transmitted through the semi reflective surface. To create the virtual image the semi-reflective surface which is provided on the windshield reflects part of the light beams without focusing those parts of the light beams so that the light beams which are reflected remain diverging after reflection. A virtual image is formed at the position where extrapolations of the divergent light beams which are reflected by the semi-reflective surface intersect (the intersection will occur at a position which is behind the semi-reflective surface which is provided on the windshield). Those light beams which are transmitted through the semi-reflective semi-transparent surface are lost and are not used to form the virtual image.

The beam combiner can be made fully reflective by either a metal coating (wherein the thickness of the metal coating is larger than the evanescent field penetration depth of the light beams) or by reflective dielectric coating which has a bandgap in the wavelength range of interest.

The projection device may further comprise one or more lenses which are arranged between the light source and the MEMS micro mirror, wherein the one or more lenses are configured to focus the light beams. Preferably a plurality of lenses is provided, each lens is provided between a light source and reflectors.

The one or more lenses may comprise a converging lens which can focus the light beam. The one or more lenses may have a biconvex or plano-convex shape with aspheric, spheric, polynomial or free form convex surfaces.

Preferably the one or more lenses are each configured to focus the light beams such that the light beams have a spot size on the reflective element which has an area which is less than, or equal to, the area of a single convex reflective projection.

It will be understood that it would be sufficient that the one or more lenses are located in an optical path followed by the light beams passing from the light source to the MEMS micro mirror.

The light beams may be collimated light beams and the projection device may further comprise a biconvex lens, plano-convex lens, achromatic lens, telecentric lens, f-theta lens, and/or cylindrical convex lens, which is arranged between the MEMS micro mirror and the reflective element, to focus the collimated light beams.

The projection device may comprise one or more converging lenses which is arranged to receive light beams which are output from the so as to convert the light beams into collimated light beams. Preferably the distance between the light source and each of the one or more converging lenses is equal to the focal length of the respective converging lens. The light beams which are output from the one or more converging lenses will be collimated. If the light source provides a red, green and blue light beams, either the light beams are first combined and then collimated, or each of the beams are individually collimated and then combine after they have been collimated.

Preferably the telecentric lens is configured to focus the collimated light beams such that the light beams have a spot size on the reflective element which has an area which is less than, or equal to, the area of a single convex reflective projection. Preferably the distance between the telecentric lens and the reflective element is equal to the focal length of the telecentric lens.

Preferably the area of the spot size will be 100 µm. Preferably the area of the spot size will be less than 300 µm.

It will be understood that it would be sufficient that the telecentric lens is located in an optical path followed by the light beams passing from the MEMS micro mirror to the reflective element.

The telecentric lens maybe further configured to make the light beams parallel. In other words the telecentric lens maybe further configured to make the chief rays (or central ray) of each of the light beams to be parallel to each other, while each of the light beams may itself be focused onto the reflective element.

The light beams may be focused such that they have a spot size on the reflective element, which has an area which is less than, or equal to, the area of a single convex reflective projection.

The convex reflective projections of the reflective element may be arranged to lie on a curved plane.

Preferably the curved plane is a convex or a concave plane.

Preferably the curvature of the curved plane is equal to the curvature of a curve along which the point at which the light beams which are reflected from the MEMS micro mirror focus (i.e. the focus point of the light beams which are reflected from the MEMS micro mirror) moves, as the MEMS micro mirror oscillates about its single oscillation axis. The focus point of light reflected by the MEMS micro mirror is the focal point of the lens which is arranged between the light source and the MEMS micro mirror to focus the light beams; or, in the embodiment which comprises a telecentric lens which focuses light beams, the focus point of light reflected by the MEMS micro mirror is the focal point of the telecentric lens.

As the MEMS micro mirror oscillates about a single oscillation axis, the focus point of the light reflected by the MEMS micro mirror will be moved over a curve (i.e. an arc). To ensure that the light beams are always focused at the surface of the convex reflective projections in the reflective element, as the MEMS micro mirror oscillated about its oscillation axis, the convex reflective projections are arranged to lie on a curved plane whose curvature is equal to the curvature of the curve over which the focus point of the light reflected by the MEMS micro mirror is moved when the MEMS micro mirror is oscillated about its single oscillation axis. In this manner the reflective element can compensate for changes in the position of focus point of light reflected by the MEMS micro mirror, which occurs when the MEMS micro mirror oscillates. Thus, the convex reflective projections of the reflective element are located at the focus length of the light reflected by the MEMS micro mirror, even as the MEMS mirror oscillates about its single oscillation axis.

Likewise the MEMS micro mirror may be oscillated about two orthogonal oscillation axes. In such a case it may be preferable to arrange the convex reflective projections of the reflective element to lie on a spherical plane, or on an aspherical plane. The curvature of spherical plane, or aspherical plane, is preferably such that it corresponds to the curvature of a plane over which the focus point of the light reflected by the MEMS micro mirror moves as the MEMS mirror oscillates about these two orthogonal oscillation axes. Thus in this manner the reflective element can compensate for changes in the position of focus point of light reflected by the MEMS micro mirror, which occurs when the MEMS micro mirror oscillates about its two orthogonal oscillation axes. Thus, the convex reflective projections of the reflective element are located at the focus length of the light reflected by the MEMS micro mirror, even as the MEMS mirror oscillates about its two orthogonal oscillation axes.

The spherical plane preferably has a concave-spherical profile (i.e. bowl-shaped). The aspherical plane preferably has a concave-aspherical profile.

The curved plane may be a concave-spherical or concave-aspherical plane.

The beam combiner may have a curved profile. The beam combiner has a curved profile to adapt the position and size of the virtual image to be comfortable for the viewer. The curved profile modifies the angle between the light beams which changes the position of where the virtual image appears. Typically the more curved the beam combiner is, the further away from the beam combiner the virtual image will appear.

Preferably the beam combiner is arranged such that a concave surface of the beam combiner receives the light beams which are reflected by the convex reflective projections of the reflective element.

A curved beam combiner will define a curved focal plane on which focal points of the beam combiner lay. As a result the virtual image will appear to be on a curved plane (i.e. on the curved focal plane), which may result in the virtual image appearing blurred.

Preferably the convex reflective projections of the reflective element are arranged to lie on a curved plane, wherein the curved plane is a convex plane. This will compensate for the effect of the curved beam combiner. Specifically, this will ensure that the virtual image will appear to be on a planar plane, thus providing a clearer virtual image.

Preferably the curvature of the curved plane on which the convex reflective projections of the reflective element lie, is such that focal points of the beam combiner lie on a planar plane. In other words, the curvature of the curved plane on which the convex reflective projections of the reflective element lie, is such that the focal points of different areas of the beam combiner will lie on the same planar plane.

Preferably the curvature of the curved plane on which the convex reflective projections of the reflective element lie, is equal to the curvature of the beam combiner. Most preferably the curvature of the curved plane on which the convex reflective projections of the reflective element lie, is equal to the curvature of the concave surface of the beam combiner on which light beams reflected by the reflective element are incident.

The curved plane may be a convex-spherical or convex-aspherical plane.

The convex reflective projections of the reflective element may be arranged to lie on a on a spherical plane, or on an aspherical plane. The spherical plane preferably has a convex-spherical profile. The aspherical plane preferably has a convex-aspherical profile.

The MEMS micro mirror may be arranged along the same axis as an axis on which the centre of the reflective element lies. In other words the MEMS micro mirror may be arranged opposite to the centre of the reflective element. The MEMS micro mirror may be aligned with the centre of the reflective element.

The reflective element is preferably oriented such that the light beams which are reflected from the MEMS micromirror to the reflective element are incident on reflective element are non-perpendicular to a plane of the reflective element. The plane of the reflective element may be the plane on which the reflective element lies. The reflective element is preferably oriented such that light beams, reflected by the MEMS micro-mirror when the MEMS micro-mirror is in a non-actuated position (i.e. a rest position), are incident on the reflective element at an angle which is non-perpendicular to a plane of reflective element. The plane of the reflective element may be the plane on which the reflective element lies.

The MEMS micro-mirror may comprise a support frame and a micro mirror attached to the support frame by means of two or more torsional arms. The two or more torsional arms define one or more oscillation axes for the micro mirror.

The MEMS micro-mirror may be arranged such that a plane of the support frame of the MEMS micro-mirror is off set from being parallel to the a plane of the reflective element lies. In other words the support frame of the MEMS micro-mirror and the reflective element will be arranged to be non-parallel to one another. This will ensure that which the micro-mirror of the MEMS micro-mirror is in a neutral position, the light beams reflected by the micro-mirror will be indecent on the reflective element at an angle which is greater than 0° and less than 90°.

The projection device may further comprise an imaging system such as DLP/DMD (Digital Light Processing/Digital Micromirror array), LCOS (Liquid Crystal on Silicon) and/or LCD (Liquid Crystal Display). The reflective element may be arranged so that the convex reflective projections direct light to the imaging system. Because the light beams are scanned by the oscillating MEMS mirror onto the reflective element, then as a result the light reflected by the convex reflective projections is despeckled and therefore can serve as illuminating source which provides despeckled light to the second imaging device or to any random surface.

The above-mentioned projection device could be used to form a head up display system. In such a system either the beam combiner or the semi-reflective surface which is provided on a windshield, may form a head-up-display.

A head-up display is any transparent or semi-transparent display that presents data without requiring users to look away from their usual viewpoints.

According to a further aspect of the present invention there is provided a method of projecting an image comprising the steps of; providing light beams which define one or more pixels of a virtual image, using a light source; reflecting the light beams using a MEMS micro mirror, and oscillating the MEMS micro mirror about at least one oscillation axis to scan the reflected light beams; receiving, at a reflective element, the light beams which are reflected by the MEMS micro mirror, the reflective element comprising a plurality of convex reflective projections, and wherein the reflective element is arranged so that light beams reflected by the MEMS micro mirror are incident on said convex reflective projections, so that the light beams are reflected by the convex reflective projections; reflecting the light beams using the convex reflective projections of the reflective element; receiving at a beam combiner the light beams which have been reflected by the convex reflective projections of the reflective element; reflecting at least some of the light beams using the beam combiner so that the reflected light beams can form a virtual image which is visible from within an eyebox.

The method may comprise the step of using the projection device in a head-up-display projection system. The method may comprise the step of using the beam combiner as a head-up-display.

The method may comprise the step or arranging the reflective element such that the convex reflective projections of the reflective element are closest to the MEMS micro mirror, than any other part of the reflective element. This will ensure that the convex reflective projections of the reflective element are first to receive the light beams reflected by the MEMS micro mirror.

The method may further comprise the step of focusing the light beams using one or more lens which is located between the light source and the MEMS micro mirror.

The step of providing light beams may comprise providing collimated light beams and the method may further comprise the step of focusing the collimated light beams using a lens. The lens may be biconvex lens, plano-convex lens, achromatic lens, telecentric lens, f-theta lens, and/or cylindrical convex lens, which is arranged between the MEMS micro mirror and the reflective element.

The method may comprise the step of focusing the light beams so that the light beams have a spot size on the reflective element, which has an area which is less than, or equal to, the area of a single convex reflective projection.

The beam combiner may be semi-reflective and semi-transparent, and the method may comprise the step of reflecting some of the light beams which are incident on the beam combiner and and transmitting some of the light beams which are incident on the beam combiner, and using the reflected light beams to define a virtual image which is viewable from within an eyebox.

The beam combiner can be thin film coated by dielectric or metal layers so that some of the light beams are transmitted through the coating and some of the light beams are reflected. Fresnel equations determine the amount of light beams which is reflected and transmitted by the dielectric coatings. For metallic coating the thickness of metal is preferably less than the evanescent penetration depth of the light beams, to allow light to be partially transmitted and partially reflected.

The beam combiner may be fully reflective and the method may further comprise the reflecting some of the light beams and transmitting some of the light beams using a semi-reflective semi-transparent surface which is provided on a windshield, to define a virtual image which is viewable from within an eyebox. The semi-reflective semi-transparent surface which is provided on a windshield may be a head-up-display.

The beam combiner may be made fully reflective by providing a thick metal coating (thicker than the evanescent field penetration depth) or by providing a reflective dielectric coating which has a bandgap in the wavelength range of interest.

The method may further comprise the step of arranging the MEMS micro mirror so that it lies on the same axis as an axis on which the centre of the reflective element lies. In other words the method may comprise the step of arranging the MEMS micro mirror so that it is opposite to a centre of the reflective element.

The method may comprise the step of arranging the reflective element such that the light beams which are reflected from the MEMS micro-mirror to the reflective element are incident on reflective element are non-perpendicular to a plane of the reflective element. The plane of the reflective element may be the plane on which the reflective element lies. The method may comprise the step of arranging the reflective element such that light beams, reflected by the MEMS micro-mirror when the MEMS micro-mirror is in a non-actuated position (i.e. a rest position), are incident on the reflective element at an angle which is non-perpendicular to a plane of reflective element. The plane of the reflective element may be the plane on which the reflective element lies.

The MEMS micro-mirror may comprise a support frame and a micro mirror attached to the support frame by means of two or more torsional arms. The two or more torsional arms define one or more oscillation axes for the micro mirror. The method may comprise the step of arranging the MEMS micro-mirror such that a plane of the support frame of the MEMS micro-mirror is off set from being parallel to the a plane of the reflective element lies. In other words the method may comprise the step of arranging the support frame of the MEMS micro-mirror and the reflective element to be non-parallel to one another. This will ensure that which the micro-mirror of the MEMS micro-mirror is in a neutral position, the light beams reflected by the micro-mirror will be indecent on the reflective element at an angle which is greater than 0° and less than 90°.

The MEMS micro-mirror may comprise a support frame and a micro mirror attached to the support frame by means of two or more torsional arms. The two or more torsional arms define one or more oscillation axes for the micro mirror. The method may comprise the step of arranging the MEMS micro-mirror such that a plane of the support frame of the MEMS micro-mirror is parallel to the reflective element but where the normal to the reflective element is not normal to the MEMS mirror support frame. In other words the method may comprise the step of arranging the support frame of the MEMS micro-mirror and the reflective element to be parallel to one another but where the input light is not normal to the reflective element. Therefore in practice, the angle of the incident light beam on the reflective element, in regards to the normal of the reflective element, is greater than 0° and less than 90°. This angle can be oriented in the vertical direction considering the HUD planar/standard orientation. In that case, this will ensure that due to this incident angle, the reflective element will not be viewed by the driver as the combiner and the reflective element will not be on the same height. This angle can be called indicatrix.

The method may further comprise the step of using the projection device in a head up display system. The method may comprise the step of using the beam combiner as a head-up-display. The method may comprise the step of using the semi-reflective surface which is provided on a windshield as a head-up-display.

BRIEF DESCRIPTION OF THE DRAWINGS

The invention will be better understood with the aid of the description of an embodiment given by way of example and illustrated by the figures, in which:

FIG. 3 provides an aerial view of a projection device according to a further embodiment of the present invention;

FIG. 4c shows a MEMS micro mirror which is configured to oscillate about two orthogonal oscillation axes, and which may be used in any of the projection devices shown in FIGS. 1-3;

FIG. 5b shows a preferred configuration for the reflective element used in the projection devices shown in FIGS. 1-3, when the MEMS micro mirror in the projection device is configured to oscillate about a single oscillation axis;

FIG. 5c shows a preferred configuration for the reflective element used in the projection devices shown in FIGS. 1-3, when the MEMS micro mirror in the projection device is configured to oscillate about a two orthogonal oscillation axis, or when the projection device comprises two MEMS micro mirrors which can oscillate about a single oscillation axis and which are arranged in optical communication and such that their oscillation axes are orthogonal;

FIG. 6a illustrates how a beam combiner which has a curved profile will focus the virtual image onto a curved plane;

DETAILED DESCRIPTION OF POSSIBLE EMBODIMENTS OF THE INVENTION

Figure 1:
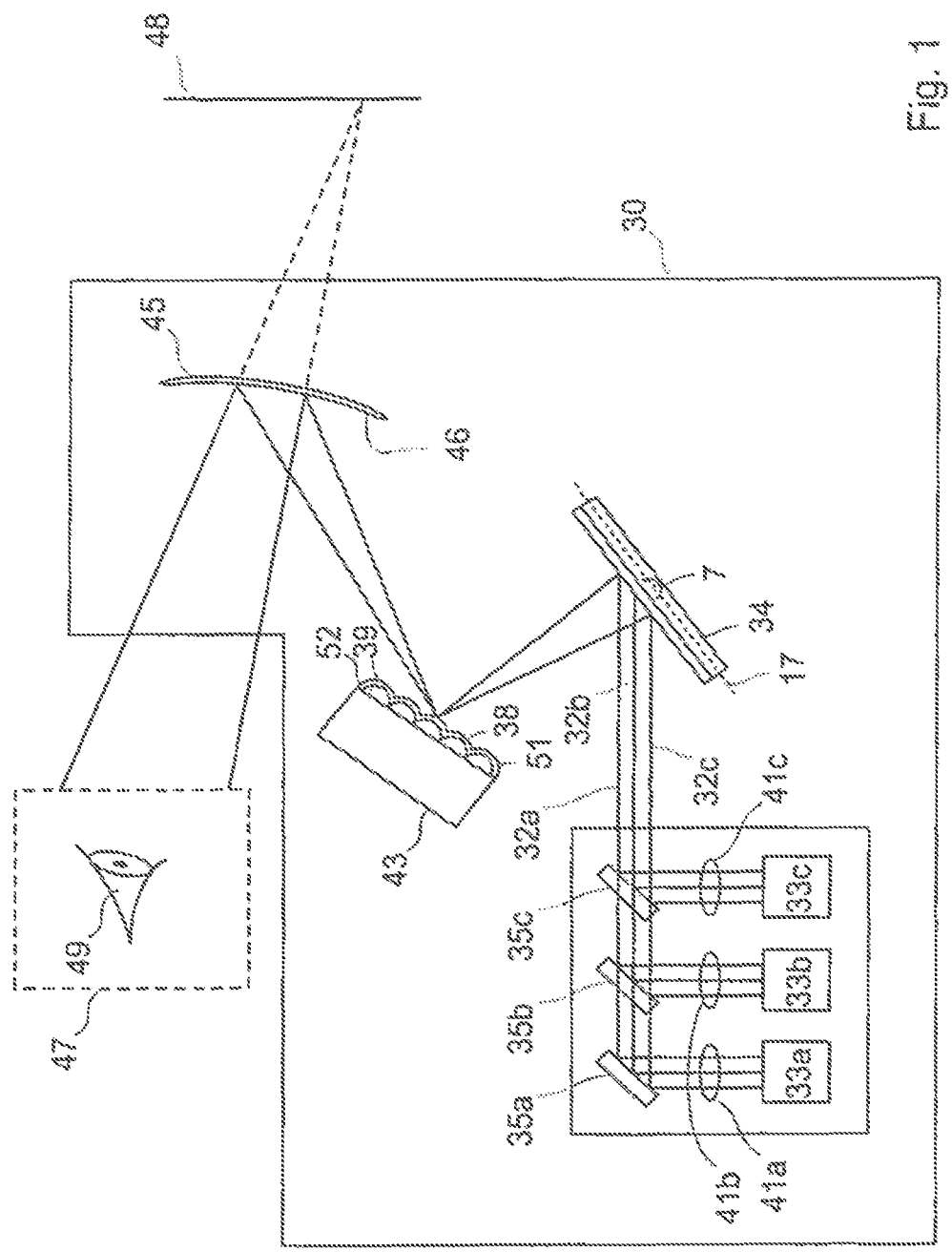
FIG. 1 provides an aerial view of a projection device according to an embodiment of the present invention.

FIG. 1a is an aerial view of a projection device 30 according to an embodiment of the present invention.

The projection device 30 comprises a light source 31 which comprises red, green and blue light sources 33a,b,c which provide red, green and blue light beams 32a,b,c respectively. The red, green and blue light beams 32a,b,c, when combined, define one or more pixels of a virtual image 48 which is projected by the projection device 30.

The projection device 30 further comprises a MEMS micro mirror 34 which is arranged to receive the light beams 32a,b,c provided by the light source 31. In this particular example the light source 31 comprises reflectors 35a,b,c which direct the red, green and blue light beams 32a,b,c, respectively, to the MEMS micro mirror 34.

The MEMS micro mirror 34 can oscillate about at least one oscillation axis 7,17 to scan the light beams 32a,b,c. As will be described in more detail later the MEMS micro mirror 34 may be configured to oscillate about a single oscillation axis 7 only, so that the MEMS micro mirror 34 scans the light beams 32a,b,c in one-dimension (i.e. along either the vertical or horizontal directions); or the MEMS micro mirror 34 may be configured to oscillate about two orthogonal oscillation axes 7,17, so that the MEMS micro mirror 34 can scan the light beams 32a,b,c in two-dimensions (i.e. along both the vertical and horizontal directions). Alternatively, the projection device 30 may comprises two MEMS micro mirrors 34 each of which has a single oscillation axis, and wherein the two MEMS micro mirrors 34 are arranged to be in optical communication and such that their oscillation axes are orthogonal; two MEMS micro mirrors 34 arranged in this manner can also achieve scanning of the light beams 32a,b,c in two-dimensions.

The projection device 30 has a reflective element 38, which comprises a plurality of convex reflective projections 39. The surface 40 of each of the convex reflective projections is fully reflective. The convex reflective projections 39 may comprise at least one of; Al, Au, Chromium, Ag, Ti, a protective layer such as $SiO_2$, SiN, and/or dielectric multilayer.

The reflective element 38 is arranged so that the light beams 32a,b,c reflected by the MEMS micro mirror 34 are incident on said convex reflective projections 39. The light beams 32a,b,c are reflected by the convex reflective projections 39.

In this particular example the reflective element 38 comprises a metallic layer which is mounted on the surface of a micro lens array 52 which comprises a plurality of convex micro lenses 51. A holder portion 43 holds the plurality of convex lenses 51 in their arrayed configuration. The plurality of convex lenses 51 are integral to the holder portion 43. The holder portion 43 and micro lens array 52 are both transparent but the metallic layer which defines the reflective element 38 is fully reflective. It should be understood that the holder portion 43 and micro lens array 52 are not essential to the invention; in fact, because the projection system 30 uses the reflective element 38 only to reflect light beams 32a,b,c, advantageously this obviates the need for a holder portion 43 and micro lens array 52.

The reflective element 38 is arranged such that the convex reflective projections 39 are closest to the MEMS micro mirror 34. In the projection device 30 illustrated in FIG. 1 the reflective element 38 is arranged such that the convex reflective projections 39 are closest to the MEMS micro mirror 34 and the holder portion 43 and micro lens array 52 are further from the MEMS micro mirror 34; this will ensure that the convex reflective projections 39 of the reflective element 38 are first to receive the light beams 32a,b,c reflected by the MEMS micro mirror 34. In particular, this will ensure that the light beams 32a,b,c are not transmitted through any part of the holder 43 or micro lens array 52; rather, the light beams 32a,b,c will be reflected by the convex reflective projections 39 without the light beams 32a,b,c having been transmitted through any part of the holder 43 or micro lens array 52.

The projection device 30 further comprises lenses 41a,b,c which are arranged between the respective red, green and blue laser sources 33a,b,c and reflectors 35a,b,c of the light source 31. The lenses 41a,b,c are configured to focus the light beams 32a,b,c. It will be understood that the lenses 41a,b,c may be alternatively are arranged between the reflectors 35a,b,c and the MEMS micro mirror 34.

The lenses 41a,b,c may each comprise a converging lens so that they focus the light beams 32a,b,c. For example the lenses 41a,b,c may each comprise a biconvex or plano convex shaped lens with aspheric, spheric, polynomial or free form convex surfaces.

In this example the lenses 41a,b,c are configured to focus the light beams 32a,b,c such that the light beams 32a,b,c have a spot size on the reflective element 38 which has an area which is less than, or equal to, the area of a single convex reflective projection 39 in the reflective element 38. Preferably, the area of the spot size will be 100 µm or less.

It will be understood that it is not necessary for the lenses 41a,b,c to be physically located between the reflectors 35a,b,c and the MEMS micro mirror 34; it would be sufficient that the lenses 41a,b,c are located in an optical path followed by the light beams 32a,b,c passing from reflectors 35a,b,c to the MEMS micro mirror 34.

The projection device 30 further comprises a beam combiner 45. In this particular example the beam combiner 45 is semi-transparent and semi-reflective. The beam combiner 45 is arranged to receive the light beams 32a,b,c which are reflected by the convex reflective projections 39 of the reflective element 38. The beam combiner 45 is shown to have a curved profile and is arranged such that a concave surface 46 of the beam combiner 45 receives the light beams 32a,b,c which are reflected by the convex reflective projections 39 in the reflective element 38.

It will be understood that the light source may provide one or more light beams which define one or more pixels of an image. For example, the light source may provide a red, green and blue light beam which may be combined to define coloured pixels of the virtual image.

As the beam combiner 45 is semi-transparent and semi-reflective it will reflect some of the light beams which it receives and will transmit some of the light beams 32a,b,c which it receives. The reflected light beams 32a,b,c only are used to project a virtual image 48. The transmitted parts of the light beams 32a,b,c are lost and are not used to project the virtual image 48. The light beams which the beam combiner 45 reflects are directed to a predefined area referred to as an eyebox 47. The eyebox 47 is an area within which the virtual image 48 is visible; outside the eyebox 47 the virtual image 48 is not visible. A user 49 can view the projected virtual image 48 only when they look at the virtual image from a location within the eyebox 47.

The beam combiner 45 has a curved profile to adapt the position and size of the virtual image 48 to be comfortable for the viewer. The curved profile modifies the angle between the light beams 32a,b,c adapt the position and size of the virtual image 48.

The beam combiner 45 can be coated by dielectric or metal layers so that some of the light beams 32a,b,c are transmitted through the beam combiner 45 and some of the light beams 32a,b,c are reflected by the beam combiner 45. The metal layers should preferably have a thickness which is less than the evanescent penetration depth of the light beams 32a,b,c to allow the light beams 32a,b,c to be partially transmitted and partially reflected. Fresnel equations determine the amount of the light beams 32a,b,c which is reflected and transmitted by the beam combiner 45.

The virtual image is formed behind the beam combiner 45. The light beams 32a,b,c reflected by the convex reflective projections 39 are diverging and are incident on the beam combiner 45. The light beams which are reflected by the beam combiner 45 remain divergent after the reflection. A virtual image 48 is formed at the position where extrapolations of the divergent light beams which are reflected by the beam combiner 45 intersect (the intersection will occur at a position which is behind the beam combiner 45).

After the light beams 32a,b,c have been reflected by the convex reflective projections 39 in the reflective element 38 the light beams 32a,b,c will be diffused. Each of the diffused light beams 32a,b,c will form a light cone. At least part of the diffused light beams 32a,b,c are reflected by the beam combiner 45. The eyebox 47 is defined by the volume in which the light cones of all the light beams 32a,b,c which are reflected by the convex reflective projections 39 on the reflective element 38 and subsequently reflected by the beam combiner 45, overlap. If a viewer's eye is located in the eyebox 47 it will receive at least one light ray which defining each of the pixels of the virtual image 48; accordingly the full virtual image 48 will be seen by the viewer. If a viewer's eye is located outside of the eyebox 47 the viewer's eye will receive light rays which define only some (or none) of the pixels of the virtual image 48; in this case the viewer will see only part (or no part) of the virtual image 48. For a viewer to see the fully virtual image their eye must be located within the eyebox 47.

It will be understood that in a further variant of the invention the beam combiner may be integral to a windshield (for example the windshield of a vehicle).

Advantageously in the projection device 30 shown in FIG. 1, the reflective element 38 acts as a diffuser to diffuse the light beams 32a,b,c and reduce the occurrence of speckle in the virtual image 48. As the light beams 32a,b,c are reflected by the convex reflective projections 39 in the reflective element 38 the light beams 32a,b,c do not transmit through an optical component (e.g. they are not transmitted through the holder 43 of the micro-lens array 52); accordingly there is no diffraction of the light beams 32a,b,c and there is a reduction the amount of light loss and parasitic light. Additionally, since the light beams 32a,b,c are not transmitted through an optical component consequently a reduction in the amount of chromatic aberration generated is achieved. Moreover the projection device 30 obviates the need for any holder portion 43 and a micro-lens array 52 since it is the reflective element 38 only which is used to reflect the light beams 32a,b,c; thus a reduction in the number of parts of the projection device 30 can be achieved by providing a projection device which comprises the reflective element 38 only without a micro-lens array 52 or holder 48. Additionally, since the convex reflective projections 39 in the reflective element 38 are convex, they are easier to manufacture than micro-lens arrays which comprise concave micro-lenses, as there is no requirement to provide pointed interfaces between the convex reflective projections. Accordingly, it is easier to manufacture the projection device 30. Furthermore, since the convex reflective projections 39 in the reflective element 38 are convex, the light beams 32a,b,c will be diffused rather than focused. Accordingly, the danger posed to a user's eyes is reduced. Finally, as the light beams are reflected by the convex reflective projections s 39 in the reflective element 38, the focal point of the reflective element 38 is located behind the convex reflective projections 39 of the reflective element 38. Accordingly, the total length of the projection device 30 can be reduced by an amount equal to twice the focal length of the reflective element 38 to provide a more compact projection device.

Figure 2:
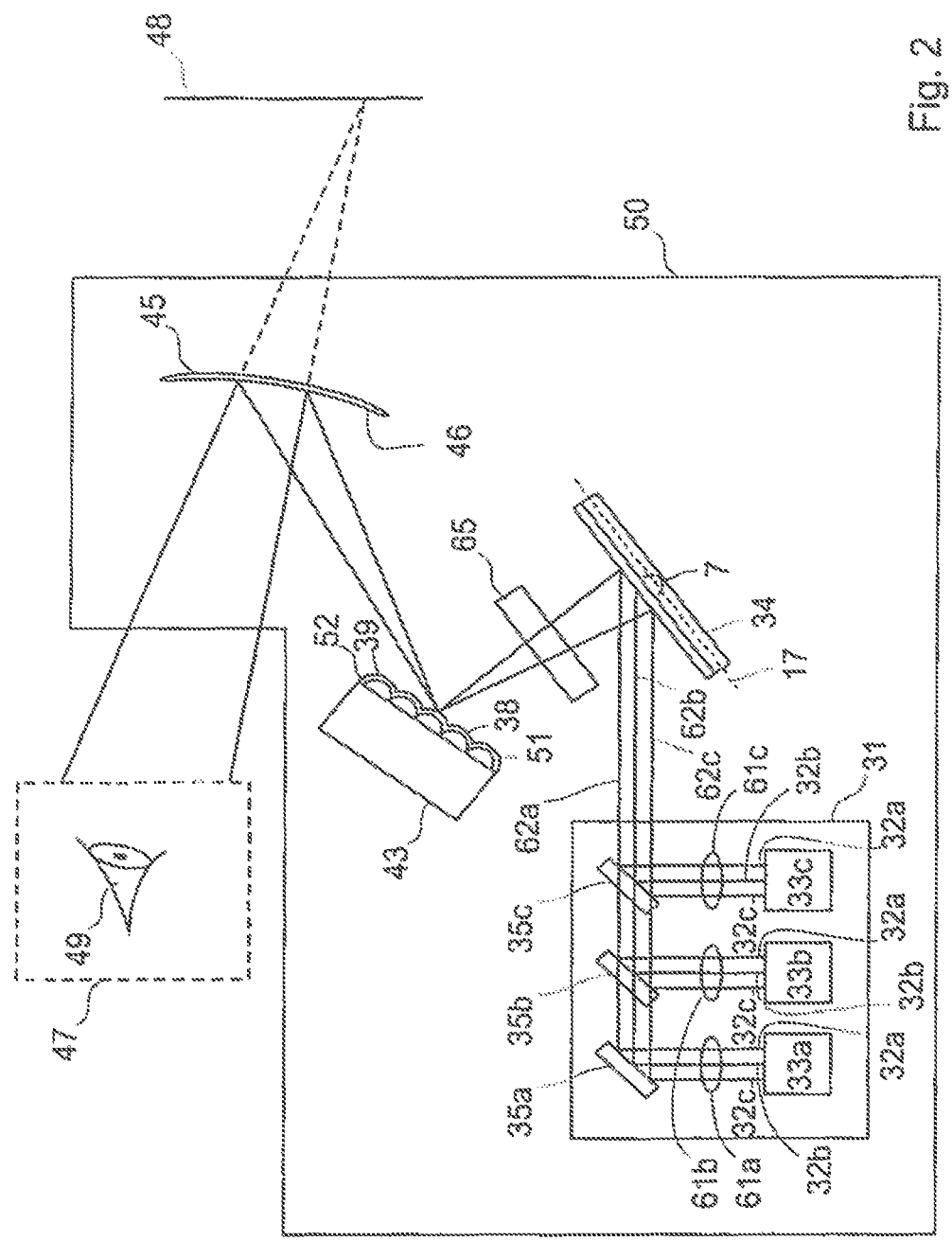
FIG. 2 provides an aerial view of a projection device according to a further embodiment of the present invention.

FIG. 2 provides an aerial view of a projection device 50 according to a further embodiment of the present invention. The projection device 50 has many of the same features as the projection device 30 shown in FIG. 1 and like features are awarded the same reference numbers.

In the projection device 50, further comprises converging lenses 61a,b,c which are arranged to receive the light beams 32a,b,c which are output from the respective red, green and blue light sources 33a,b,c, and which collimate the light beams 32a,b,c used to provide collimated light beams 62a,b,c which is output from the light source 31. The distance between the red, green and blue light sources 33a,b,c and each of the converging lenses 61a,b,c is preferably equal to the focal length of the respective converging lens 61a,b,c.

The MEMS micro mirror 34 receives collimated light beams 62a,b,c from the light source 31.

The projection device 50 further comprises a telecentric lens 65 which is arranged between the MEMS micro mirror 34 and the reflective element 38. The telecentric lens 65 will focus the collimated light beams 62a,b,c and will also make the light beams 62a,b,c parallel. In other words the telecentric lens 65 will make chief rays (or central ray) of each of the collimated light beams 62a,b,c parallel to each other, while each of the individual collimated light beams 62a,b,c are focused onto the reflective element 38. The telecentric lens 65 is configured to focus the collimated light beams 62a,b,c such that the light beams 62a,b,c have a spot size on the micro-lens array 38 which has an area which is less than, or equal to, the area of a single convex reflective projection 39 in the reflective element 38. Preferably, the area of the spot size will be 100 µm or less.

It will be understood that it is not necessary for the telecentric lens 65 to be physically located between the MEMS micro mirror 34 and the reflective element 38; it would be sufficient for the telecentric lens 65 to be located in an optical path followed by the light beams 62a,b,c passing from the MEMS micro mirror 34 to the reflective element 38.

FIG. 3 shows an aerial view of a projection device 100 according to a further embodiment of the present invention. The projection device 100 has many of the same features of the projection device 30 shown in FIG. 1 and like features are awarded the same reference numbers.

In the projection device 100 the beam combiner 81 is configured to be fully reflective. The projection device 100 further comprises a semi-reflective semi-transparent surface 82 which is provided on a windshield 83. The windshield 83 may be the windshield of a vehicle such as a car or motorbike. The semi-reflective semi-transparent 82 surface is arranged to receive light beams 32a,b,c which are reflected by the fully reflective beam combiner 81. The beam combiner 81 may be made fully reflective by providing the beam combiner 81 with a metal coating (thicker than the evanescent field penetration depth of the light beams 32a,b,c) or by providing the beam combiner 81 with a reflective dielectric coating which has a bandgap in the wavelength range of interest.

The semi-reflective semi-transparent surface 82 on the windshield 83 reflects some of the light beams 32a,b,c which it receives from the beam combiner 81. The light beams 32a,b,c which are reflected by the semi-reflective semi-transparent surface 82 are used to project a virtual image 48. The parts of the light beams 32a,b,c which are transmitted through the semi-reflective semi-transparent surface 82 are lost and are not used. The light beams which the semi-reflective semi-transparent surface 82 reflects are directed to a predefined area referred to an eyebox 47. A user 49 can view the projected virtual image 48 only when they look at the virtual image 48 from a location within the eyebox 47.

After the light beams have been reflected by the convex reflective projections 39 in the reflective element 38 the light beams 32*a,b,c* will be diffused. Each of the diffused light beams 32*a,b,c* will form a light cone. After the light beams 32*a,b,c* have been reflected by the convex reflective projections 39 in the reflective element 38 the light beams 32*a,b,c* will be diffused. Each of the diffused light beams 32*a,b,c* will form a light cone. At least some of the diffused light beams 32*a,b,c* are reflected by the semi-reflective semi-transparent surface 82. The eyebox 47 is defined by the volume in which the light cones of all the light beams which are reflected by the convex reflective projections 39 on the reflective element 38 and subsequently reflected by the semi-reflective semi-transparent surface 82, overlap. The size of the eyebox 47 depends on the range of angles over which the semi-reflective semi-transparent surface 82 can receive light from the fully reflective beam combiner 81. This range of angles may depend on the size of the semi-reflective semi-transparent surface 82, on the distance between the beam combiner 81 and the semi-reflective semi-transparent surface 82 and on the distance between the virtual image 48 and semi-reflective semi-transparent surface 82. For example, a large semi-reflective semi-transparent surface 82 can receive light from the beam combiner 81 over a large range of angles, accordingly the volume in which all light cones overlap will be large and the thus the eyebox 47 will be large; while a smaller semi-reflective semi-transparent surface 82 can receive light from the beam combiner 81 over a smaller range of angles, accordingly the volume in which all light cones overlap will be small and the thus the eyebox 47 will be small.

Some of light beams 32*a,b,c* are reflected by the semi-reflective semi-transparent surface 82 on the windshield 83 and another some of the light beam 32*a,b,c* are transmitted through the semi-reflective semi-transparent surface 82 on the windshield 83. The light beams which are reflected by the semi-reflective semi-transparent surface 82 remain divergent after the reflection. The virtual image 48 is formed behind the semi-reflective semi-transparent surface 82 on the windshield 83. The light beams reflected by the convex reflective projections 39 of the reflective element are diverging and are indecent on beam combiner 81 where they are reflected to the semi-reflective semi-transparent surface 82. The light beams which are reflected by the semi-reflective semi-transparent surface 82 remain divergent after they are reflected by the semi-reflective semi-transparent surface 82. A virtual image 48 is formed at the position where extrapolations of the divergent light beams which are reflected by the semi-reflective semi-transparent surface 82 intersect (the intersection will occur at a position which is behind the semi-reflective semi-transparent surface 82). The light beams which are transmitted through the semi-reflective semi-transparent surface 82 are lost and are not used to form the virtual image 48.

As discussed, the MEMS micro mirror 34 used in each of the projection devices 30,50,100 shown in FIGS. 1-3 may be configured either to oscillate about a single oscillation axis 7 only, to scan the light beams 32*a,b,c* in one-dimension (i.e. along either the vertical or horizontal directions), or configured to oscillate about two orthogonal axes 7,17 to scan the light beams 32*a,b,c* in two-dimensions (i.e. along both the vertical and horizontal directions). Or alternatively, in order to scan the light beams 32*a,b,c* in two-dimensions, the projection devices 30,50,100 may be provided with two MEMS micro mirrors 34, each of which can oscillate about a single oscillation axis, and wherein the MEMS micro mirrors 34 are arranged to be in optical communication and such that their oscillation axes are orthogonal to one another; in this case one of the MEMS micro mirrors can be used to scan the light beams 32*a,b,c* in the vertical direction; the light beams 32*a,b,c* which are scanned in the vertical direction are received by the other MEMS micro mirror; the other MEMS micro mirror oscillates to scan the light beams 32*a,b,c* in the horizontal direction, thus achieving two-dimensional scanning of the light beams 32*a,b,c*.

Figure 4A:
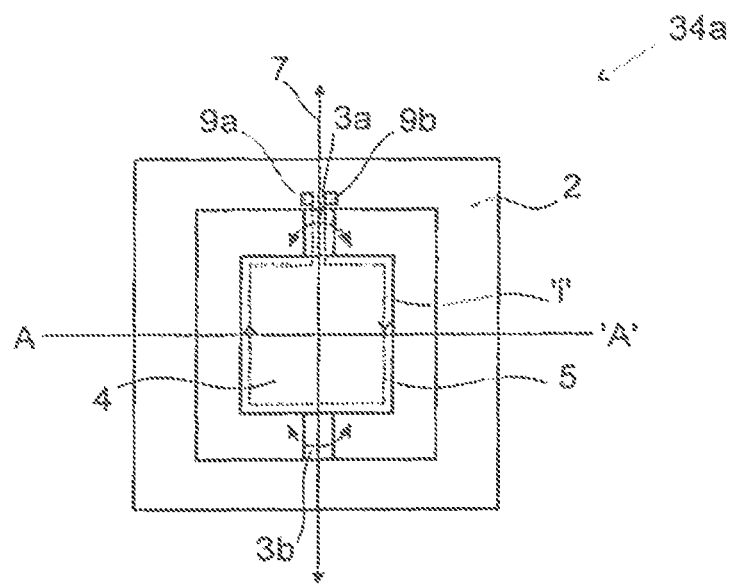
FIGS. 4a and 4b show a MEMS micro mirror which is configured to oscillate about a single oscillation axis, and which may be used in any of the projection devices shown in FIGS. 1-3.
Figure 4B:
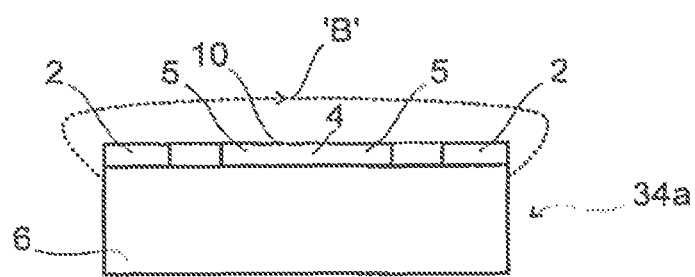

FIGS. 4*a* and 4*b* show a MEMS micro mirror 34*a* which is configured to oscillate about a single oscillation axis 7 and FIG. 4*c* shows a MEMS micro mirror 34*b* which is configured to oscillate about a two orthogonal oscillation axes 7,17. The MEMS micro mirror 34 used in the projection device 30,50,100 may be configured as the MEMS micro mirror 34*a* shown in FIGS. 4*a* and 4*b*, or may be configured as the MEMS micro mirror 34*b* shown in FIG. 4*c*. It will be understood that the projection device 30,50,100 may be provided with two MEMS micro mirrors 34 each configured as the MEMS micro mirror 34*a* shown in FIGS. 4*a* and 4*b*, and the two MEMS micro mirrors being arranged to be in optical communication and such that their oscillation axes are orthogonal.

Referring to FIGS. 4*a* and 4*b*; FIG. 4*a* provides a plan view of the MEMS micro-mirror 34*a* and FIG. 4*b* shows a cross sectional view of the MEMS micro-mirror 34*a*, taken along A-A' of FIG. 4*a*. The MEMS micro-mirror 34*a* is shown to comprise a first support frame 2. A first torsional arm 3*a* and second torsional arm 3*b* connect a mirror 4 to the support frame 2. The support frame 2 is fixed (i.e. immovable). The first and second torsional arms 3*a,b* define a first oscillation axis 7 for the mirror 4. A first actuation coil 5 is supported on, and connected to, the mirror 4. The first actuation coil 5 is arranged to extend, from a first electrical contact 9*a* which is located on the support frame 2, along the first torsional arm 3*a*, and around the perimeter of the mirror 4 and back along the first torsional arm 3*a* to a second electrical contact 9*b* which is located on the support frame 2.

The first support frame 2, first and second torsional arms 3*a,b* and the MEMS micro mirror 4, and first actuation coil 5, define collectively a MEMS die 10. As shown in FIG. 4*b*, the MEMS die 10 is supported on a magnet 6 such the first actuation coil 5 is submerged in the magnetic field 'B' generated by the magnet 6.

During use an electric current 'I' is passed through the first actuation coil 5. As the first actuation coil 5 is submerged in the magnetic field 'B' created by the magnet 6, the actuation coil 5 will provide a Laplace force which will be applied to the mirror 4. The Laplace force will cause the mirror 4 to oscillate about its first oscillation axis 7. The mirror 4 may reflect light beams 32*a,b,c*, 62*a,b,c* it receives as it oscillates, thereby scanning the light beams 32*a,b,c*, 62*a,b,c* in one-dimension.

If a first and second MEMS micro mirror, each with the same features as the MEMS micro mirror 34*a* shown in FIG. 4*a*, are arranged in optical communication, and arranged such that the oscillation axes 7 of both mirrors 4 are orthogonal, then the light beams 32*a,b,c*, 62*a,b,c* can be scanned by the MEMS micro mirrors, in two-dimensions (typically along the horizontal and vertical). Alternatively, to enable light beams 32*a,b,c*, 62*a,b,c* to be scanned in two-dimensions the mirror 4 in the MEMS micro mirror 34 may be configured to oscillate about two orthogonal oscillation axes 7,17. FIG. 4*c* shows a MEMS micro mirror 34*b* which is configured to oscillate about two orthogonal oscillation axes 7,17.

The MEMS micro-mirror 34*b* has many of the same features of the MEMS micro-mirror 34*a* shown in FIGS. 4*a* and 4*b*; however in the MEMS micro-mirror 34*b* the support frame 2 is configured to be moveable; the support frame 2 is configured such that it can oscillate about a second oscillation axis 17, which is orthogonal to the first oscillation axis 7.

The MEMS micro-mirror 34b further comprises a fixed part 12 (i.e. an immovable part); the support frame 2 is connected to the fixed part 12 via third and fourth torsional arms 13a,b. The third and fourth torsional arms 13a,b, define the second oscillation axis 17. A second actuation coil 15 is connected to the support frame 2. This second actuation coil 15 will also be submerged by the magnetic field 'B' generated by the magnet 6.

A second actuation coil 15 is supported on, and connected to, the support frame 2. The second actuation coil 15 is arranged to extend, from a first electrical contact 19a which is located on the fixed part 12, along the third torsional arm 13a, around the perimeter of the support frame 2 and back along the third torsional arm 13a to a second electrical contact 19b which is located on the fixed part 12. It should be noted that the second actuation coil 15 does not extend along the fourth torsional arm 13b.

Furthermore, in the MEMS micro-mirror device 20 the first and second electrical contacts 9a,9b for the first actuation coil 5 are located on the fixed part 12, and thus the first actuation coil 5 is arranged to also extend along the support frame 2 and the third and fourth torsional arms in order to electrically connect to the first and second electrical contacts 9a,9b.

During use an electric current 'i' is passed through the first actuation coil 5 which is connected to the mirror 4. As the first actuation coil 5 is submerged in the magnetic field 'B' created by the magnet 6 the first actuation coil 5 will provide a Laplace force which will be applied to the mirror 4. The Laplace force will cause the mirror 4 to oscillate about the first oscillation axis 7. An electric current 'I' is also passed through the second actuation coil 15 which k connected to the support frame 2. As the second actuation coil 15 is also submerged in the magnetic field 'B' created by the magnet 6, the second actuation coil 15 will provide a Laplace force which will be applied to the support frame 2. The Laplace force which is applied to the support frame 2 by the second actuation coil 15 will cause the support frame 2, and thus the mirror 4 which is connected to the support frame 2 via the torsional arms 13a,b, to oscillate about the second oscillation axis 17. Accordingly the mirror 4 will be oscillated about the first and second orthogonal oscillation axes 7,17. If the mirror 4 reflects light beams as it is oscillating about the first and second orthogonal oscillation axes 7,17 the reflected light beams 32a,b,c, 62a,b,c will be scanned in two dimensions e.g. horizontal and vertical.

If the MEMS micro mirror 34 provided in the projection devices 30,50,100 is configured as the MEMS micro mirror 34a shown in FIGS. 4a and 4b (i.e. if the MEMS micro mirror 34 is configured to oscillate about a single oscillation axis 7), then the focus point of the light reflected by the MEMS micro mirror 34 will move along a curve (i.e. an arc) as the MEMS micro mirror 34 oscillates about its single oscillation axis 7. It should be remembered that the in the projection device 30,50,100 the light beams 32a,b,c, 62a,b,c are focused by means of the lenses 41a,b,c or telecentric lens 65 respectively. In the projection device 30,50 the focus point of light reflected by the MEMS micro mirror is the focal point of the lenses 41a,b,c which is arranged between the light source and the MEMS micro mirror to focus the light beams 32a,b,c; or, in the projection device 100 which comprises a telecentric lens 65 which focuses light beams, the focus point of light reflected by the MEMS micro mirror is the focal point of the telecentric lens 65. Therefore, effectively, oscillation of the MEMS micro mirror 34 about a single oscillation axis 7 will cause the focal point of the lenses 41a,b,c or the focal point of the telecentric lens 65 to move along a curve (arc) as the MEMS micro mirror 34 oscillates about its single oscillation axis 7.

Figure 5A:
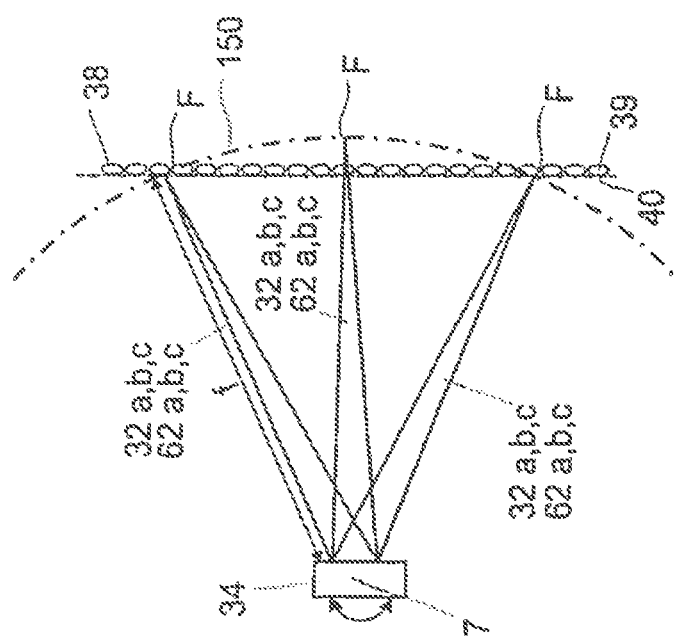
FIG. 5a shows how the focus point of the light reflected by the MEMS micro mirror moves along a curved plane (an arc) as the MEMS micro mirror oscillates about an oscillation axis.

FIG. 5a illustrates that as the MEMS micro mirror 34 oscillates about a single oscillation axis 7, the focus point (F) of the light reflected by the MEMS micro mirror 34 is moved along a curve 150 (i.e. an arc 150). This occurs because the focus length (f) of the light reflected by the MEMS micro mirror 34 remains constant as the MEMS micro mirror 34 oscillates about the single oscillation axis 7.

Likewise if the MEMS micro mirror 34 is configured as the MEMS micro mirror 34b shown in FIG. 4c (i.e. if the MEMS micro mirror 34 is configured to oscillate about two orthogonal oscillation axes 7,17) then the focus point of the light reflected by the MEMS micro mirror 34 will move along a curved plane, more specifically the focus point of the light reflected by the MEMS micro mirror 34 win move along a concave-spherical or concave-aspherical plane.

It can be seen from FIG. 5a that because the position of the focus point (F) is moving along a curved plane, the position of the convex reflective projections 39 in the reflective element 38 will not always correspond to the position of focus point (F) of the light reflected by the MEMS micro mirror 34. As a result the light beams 32a,b,c, 62a,b,c will not be focused to a point on the convex reflective projections 39 in the reflective element 38; this will result in a decrease in the quality of the virtual image 48.

FIGS. 5b and c shows preferred configurations for the reflective element 38 used in the projection devices 30,50, 100 shown in FIGS. 1-3. FIG. 5b illustrates a first configuration for the reflective element 38 and FIG. 5c illustrates a second configuration for the reflective element 38. The configurations illustrated in FIGS. 5b and 5c can compensate for the movement of the focus point (F) of the light reflected by the MEMS micro mirror 34 along a curved plane, which occurs when the MEMS micro mirror 34 oscillates, so that the position of the convex reflective projections 39 in the reflective element 38 will always correspond to position of the focus point (F) of the light reflected by the MEMS micro mirror 34.

FIG. 5b shows a preferred configuration for the reflective element 38 when the projection device 30,50,100 comprises a single MEMS micro mirror 34 which oscillates about a single oscillation axis 7 (i.e. the MEMS micro mirror 34 is configured as the MEMS micro mirror 34a shown in FIGS. 4a and 4b).

In the configuration illustrated in FIG. 5b, the convex reflective projections 39 of the reflective element 38 are arranged to lie on a curved plane 120. The curved plane 120 is a concave plane. The curvature of the curved plane 120 is equal to the curvature of the curve 150 (i.e. arc 150) along which the focus point (F) of the light reflected by the MEMS micro mirror 34 moves as the MEMS micro mirror 34 oscillates about its single oscillation axis 7. In this manner reflective element 38 can compensate for the changes in the position of focus point (F) of MEMS micro mirror 34, which occurs when the MEMS micro mirror 34 oscillates about its single oscillation axis 7. As the convex reflective projections 39 of the reflective element 38 lie on a curved plane 120 whose curvature is equal to the curvature of the curve 150 (i.e. arc 150) along which the focus point (F) of the light reflected by the MEMS micro mirror 34 moves as the MEMS micro mirror 34 oscillates about its single oscillation axis 7, the position of the convex reflective projections 39 in the reflective element 38 will always correspond to the position of focus point (F) of the light reflected by the MEMS micro mirror 34. As a result the light beams 32a,b,c, 62a,b,c will be focused to a point on the convex reflective projections 39 in the reflective element 38, throughout the whole amplitude of oscillation of the MEMS micro mirror 34. As a result, the quality of the virtual image 48 will not be compromised by the movement of the focus point (F) of the light reflected by the MEMS micro mirror 34 along a curved plane, as the MEMS micro mirror 34 oscillates.

FIG. 5c shows a preferred configuration for the reflective element 38 when the projection device 30,50,100 comprises a MEMS micro mirror 34 which can oscillate about two orthogonal oscillation axes 7,17 i.e. the MEMS micro mirror 34 is configured as the MEMS micro mirror 34b shown in FIG. 4c, (or, as the case may be, when the projection device 30,50,100 comprises two MEMS micro mirrors 34 each configured as the MEMS micro mirror 34a shown in FIGS. 4a and 4b, and each arranged in optical communication with one another and such that the oscillation axis of the two MEMS micro mirrors are orthogonal).

In the configuration illustrated in FIG. 5c, the convex reflective projections 39 of the reflective element 38 are arranged to lie on a spherical plane 125, or more specifically a concave-spherical plane 125. The curvature of the concave-spherical plane 125 is equal to the curvature of the concave-spherical plane along which the focus point (F) of the light reflected by the MEMS micro mirror 34 moves as the MEMS micro mirror 34 oscillates about it two orthogonal oscillation axis 7,17 (or, as the case may be, as the two MEMS micro mirrors which are in optical communication and which have oscillation axes which are orthogonal, oscillate about their respective oscillation axes). In this manner the reflective element 38 can compensate for the movement of focus point (F) of light reflected by the MEMS micro mirror 34 along the concave-spherical plane, which occurs when the MEMS micro mirror 34 oscillates about its two orthogonal oscillation axis 7,17. As the convex reflective projections 39 of the reflective element 38 lie on a concave-spherical plane 125 whose curvature is equal to the curvature of the concave-spherical plane along which the focus point (F) of the light reflected by the MEMS micro mirror 34 moves as the MEMS micro mirror 34 oscillates about its two orthogonal oscillation axis 7,17, (or, as the case may be, as the two MEMS micro mirrors which are in optical communication and which have oscillation axes which are orthogonal, oscillate about their respective oscillation axes) the position of the convex reflective projections 39 in the reflective element 38 will always correspond to the position of focus point (F) of the light reflected by the MEMS micro mirror 34. Thus the quality of the virtual image 48 will not be compromised by the movement of the focal point (F) of the MEMS micro mirror 34 along the concave-spherical plane, as the MEMS micro mirror 34 oscillates.

It should be understood that in a another embodiment of the present invention, the focus point of the light reflected by the MEMS micro mirror 34 may be moved along an concave-aspherical plane as the MEMS micro mirror 34 oscillates. In such a case the convex reflective projections 39 of the reflective element 38 may be arranged to lie on a concave-aspherical plane. The curvature of the concave-aspherical plane will be equal to the curvature of the concave-aspherical plane along which the focus point (F) of the light reflected by the MEMS micro mirror 34 moves as the MEMS micro mirror 34 oscillates. This will ensure that the position of the convex reflective projections 39 of the reflective element 38 will always correspond to the position of focus point (F) of the light reflected by the MEMS micro mirror 34. Thus the quality of the virtual image 48 will not be compromised by the movement of the focus point (F) of the light reflected by the MEMS micro mirror 34, along the concave-aspherical plane, as the MEMS micro mirror 34 oscillates. FIG. 6a illustrates the beam combiner 45,81 used in the projection devices 30,50,100 shown in FIGS. 1-3. It can be seen from FIG. 6a that the beam combiner 45,81 has a curved profile. As already illustrated in FIGS. 1-3, the concave surface 46 of the beam combiner 45,81 receives the light beams 32a,b,c 62a,b,c from the reflective element 38.

The curved beam combiner 45,81 will define a curved focal plane 200 (i.e. the focal plane 200 is a plane defined by focal points of different areas of the beam combiner 45,81). The curved combiner 45,81 will thus focus the virtual image 48 onto the curved focal plane 200. As a result the virtual image 48 will appear distorted or blurred. The beam combiner 45,81 has a curved profile to specify the position of the focal plane 200 and to adapt the position and size of the virtual image 48 so that it is comfortable for the viewer 49.

Figure 6B:
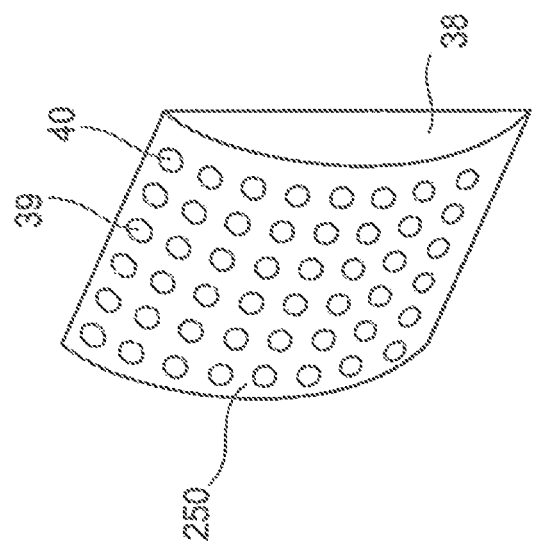
FIG. 6b shows an alternative configuration for the reflective element used in the projection devices shown in FIGS. 1-3.

FIG. 6b shows an alternative configuration for the reflective element 38 which may be used in the projection devices 30,50,100 shown in FIGS. 1-3, to compensate for the effect of the curved beam combiner 45,81.

In the configuration for the reflective element 38 shown in FIG. 6b, the convex reflective projections 39 of the reflective element 38 are arranged to lie on a convex curved plane 250. The curvature of the convex curved plane 250 on which the convex reflective projections 39 of the reflective element 38 lie, is such that focal points (F) of all areas of the beam combiner 45,81 will lie on the same planar plane. In this particular example the curvature of the convex curved plane 250 on which the convex reflective projections 39 of the reflective element 38 lie, is preferably equal to the curvature of the concave surface 46 of the beam combiner 45,81 which receives the light beams 32a,b,c 62a,b,c from the reflective element 38. The configuration for the reflective element 38 shown in FIG. 6b will thus compensate for the effect of the curved beam combiner 45,81, thereby ensuring that the virtual image 48 will appear to be on a planar plane so that virtual image 48 will appear clearer to a viewer.

It should noted that any one of the projection devices 30,50,100 may be used to provide a head-up-display projection system. In the case the projection devices 30,50 are used to provide the head-up-display projection system the beam combiner 45 may be used as the head-up-display. In the case the projection device 100 is used to provide the head-up-display projection system the semi-reflective semi-transparent surface 82 which is provided on a windshield 83 may be used as the head-up-display.

Various modifications and variations to the described embodiments of the invention will be apparent to those skilled in the art without departing from the scope of the invention as defined in the appended claims. For example, in the projection devices 30,50,100 shown in FIGS. 1a-3, although the MEMS micro mirror of the projection device 30 is shown to be offset from the centre of the reflective element 38 it will be understood that the MEMS micro mirror could be aligned with the centre of the reflective element 38.

An additional variation is that the projection devices 30,50,100 may each further comprise an imaging system such as DLP/DMD (Digital Light Processing/Digital Micromirror array), LCOS (Liquid Crystal on Silicon) and/or LCD (Liquid Crystal Display); the reflective element may be arranged so that the convex reflective projections direct light to the imaging system. In this case the pixels of the image are defined by the imaging system using the light beams. Because the light beams are scanned by the oscillating MEMS mirror onto the reflective element, then as a result the light reflected by the convex reflective projections is despeckled and therefore can serve as illuminating source which provides despeckled light to the second imaging device or to any random surface.

Although the invention has been described in connection with specific preferred embodiments, it should be understood that the invention as claimed should not be unduly limited to such specific embodiment.

The invention claimed is:

1. A projection system to form a virtual image to be viewed within an eyebox, comprising:
   a light source to generate a plurality of light beams;
   at least one MEMS micro mirror positioned to receive the light beams from the light source, the at least one MEMS micro mirror arranged to oscillate about at least one oscillation axis and reflect the light beams, wherein a position of a focus point of light reflected by the at least one MEMS micro mirror moves along a first curved plane as the at least one MEMS micro mirror oscillates;
   a reflective element positioned to receive the light beams reflected by the at least one MEMS micro mirror, the reflective element comprising a plurality of convex reflective projections on a second curved plane, wherein the second curved plane is a concave plane, and wherein a curvature of the second curved plane is selected to match a curvature of the first curved plane; and
   a beam combiner positioned and oriented to receive the light beams reflected by the reflective element and at least partially reflect the light beams to form the virtual image.

2. The projection system of claim 1, wherein the second curved plane is a concave-cylindrical plane.

3. The projection system of claim 1, wherein the second curved plane is a concave-spherical plane or a concave-aspherical plane.

4. The projection system of claim 1, wherein the at least one MEMS micro mirror is arranged to oscillate about two orthogonal oscillation axes.

5. The projection system of claim 1, wherein the at least one MEMS micro mirror includes a first MEMS micro mirror that is arranged to oscillate about a first oscillation axis and a second MEMS micro mirror that is arranged to oscillate about a second oscillation axis.

6. The projection system of claim 1, further comprising at least one lens in an optical path between the light source and the at least one MEMS micro mirror to focus light beams from the light source to have a spot size on the reflective element with an area that is less than or equal to the area of one of the convex reflection projections.

7. The projection system of claim 1, further comprising at least one lens in an optical path between the light source and the at least one MEMS micro mirror to focus light beams from the light source to have a spot size of less than 300 μm on the reflective element.

8. The projection system of claim 1, further comprising at least one lens in an optical path between the at least one MEMS micro mirror and the reflective element.

9. The projection system of claim 8, wherein the at least one lens is a telecentric lens.

10. The projection system of claim 1, further comprising a semi-reflective semi-transparent surface positioned and oriented to receive reflected light beams from the beam combiner.

11. The projection system of claim 10, further comprising a windshield, wherein the semi-reflective semi-transparent projection surface is positioned on the windshield.

12. The projection system of claim 1, further comprising at least one of Digital Light Processing Array, Digital Micromirror Array, Liquid Crystal on Silicon, and Liquid Crystal Display positioned to receive the light beams reflected from the reflective element and to redirect the light beams to the beam combiner.

\* \* \* \* \*